No. 729,422. PATENTED MAY 26, 1903.
M. C. RYPINSKI & J. LE C. DAVIS.
VOLT AMPERE METER.
APPLICATION FILED MAR. 31, 1902.
NO MODEL.
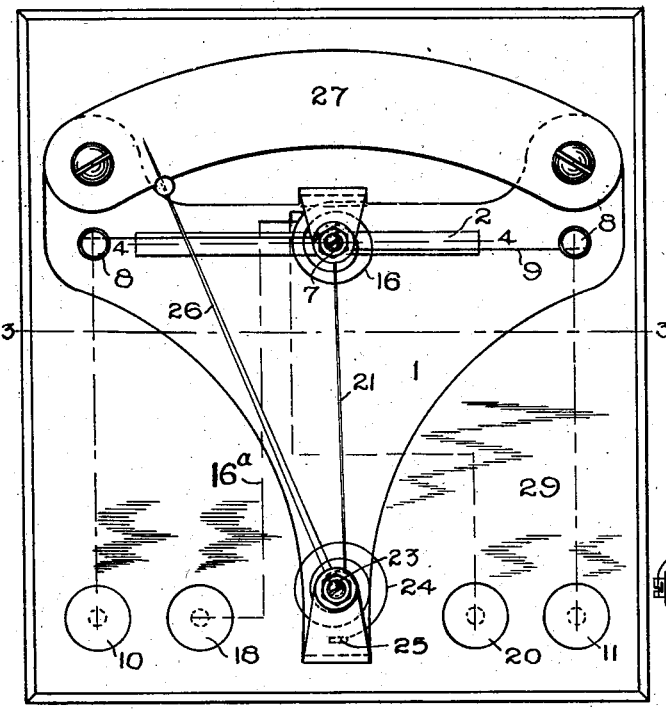
Fig. 1.
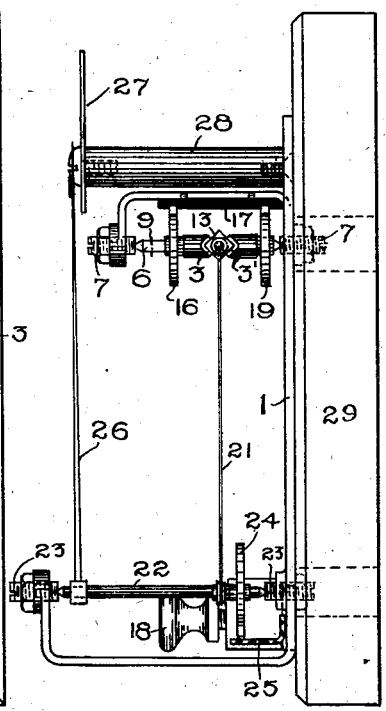
Fig. 2.
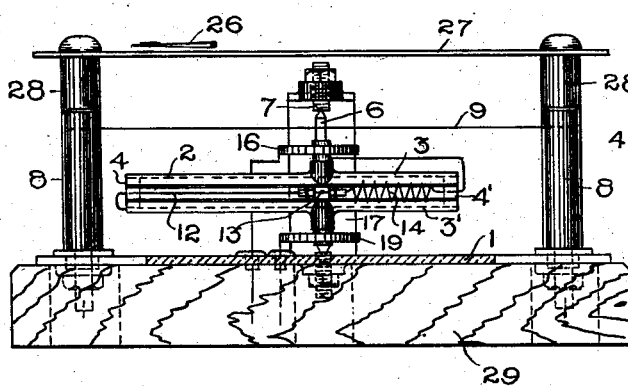
Fig. 3.
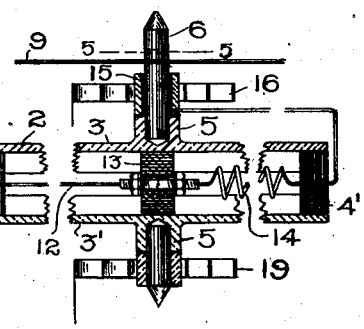
Fig. 4.
Fig. 5.
Witnesses.
Inventors.
Maurice C. Rypinski.
J. Le Conte Davis.
by Albert G. Davis
Atty.

No. 729,422. Patented May 26, 1903.

UNITED STATES PATENT OFFICE.

MAURICE C. RYPINSKI AND JOSEPH LE CONTE DAVIS, OF SCHENECTADY, NEW YORK, ASSIGNORS TO GENERAL ELECTRIC COMPANY, A CORPORATION OF NEW YORK.

VOLT-AMPERE METER.

SPECIFICATION forming part of Letters Patent No. 729,422, dated May 26, 1903.

Application filed March 31, 1902. Serial No. 100,654. (No model.)

*To all whom it may concern:*

Be it known that we, MAURICE C. RYPINSKI and JOSEPH LE CONTE DAVIS, citizens of the United States, residing at Schenectady, county of Schenectady, State of New York, have invented certain new and useful Improvements in Volt-Ampere Meters, of which the following is a specification.

It is oftentimes useful to know the product of the volts multiplied by the amperes flowing in a given circuit. This product is usually obtained by means of the readings of the voltmeter and the ammeter taken separately and multiplied together. In a direct-current circuit an ordinary wattmeter can be used which will read directly on a scale of volt-amperes. However, with alternating current it is sometimes desirable to know the volt-amperes as well, and an ordinary wattmeter would indicate the product of the volts times the amperes times the cosine of the angle between the volts and amperes in the circuit. With direct current this angle must always be zero, and therefore the instrument which is the subject of the present application would be for direct current a wattmeter. In an alternating circuit, however, the watts represent the energy output, while the volt-amperes represent the heating-load which is on the generators, and therefore determine the extent to which the plant can be loaded—that is, the generators might easily be burned out if full load was applied as indicated by wattmeters only. It is customary to gage the load by means of ammeters at the present time, assuming that the voltage remains constant.

Our invention consists in a modification of what is known as a "hot-wire" instrument, whereby the volt-amperes will be accurately indicated whether employed in measuring direct or alternating currents. The instrument may be used not only for the purpose specified above, but also in connection with a wattmeter in determining plant efficiency or the power factor of a given circuit, the latter being the ratio of the watts active in the circuit to the product of the volts times the amperes flowing.

The specific means employed in the instrument shown are two wires so connected to a movable pointer that the expansion of either one wire or the other will not cause the pointer to move, but the expansion of both will cause a movement of certain elements, which by means of suitable mechanical connections will produce an indication of the product of the elongation of the two wires. One wire will be elongated by the current and the other wire by the volts. One wire covers the angular movement of the shaft and the other the degree of eccentricity of a piece carried by said shaft and which is movable in a radial direction therefrom and attached to an indicating device. Thus the amperes, for example, may control the angular movement of the shaft and the volts the radial distance of the device carried by the shaft, and the net result is the product of the two, causing a deflection of the pointer or indicator representing volt-amperes.

Referring to the accompanying drawings, Figure 1 shows the instrument in plan. Fig. 2 is a side elevation of the same with binding-posts 11 and 20 and post 8 removed. Fig. 3 is a section through 3 3 of Fig. 1. Fig. 4 is a section through 4 4 of Fig. 1, and Fig. 5 is a section through 5 5 of Fig. 4.

On a suitable metal base-plate 1 is pivotally mounted a frame 2, composed, preferably, of two parallel metal guides 3 3', connected at their ends by insulating-blocks 4 4'. At about the middle of each guide is a socket 5, in which is firmly secured a spindle 6, the axes of both spindles being in line and perpendicular to the axis of the frame 2. The spindles are journaled in adjustable bearings 7, so that the frame can turn in a plane preferably parallel with the base-plate 1. Posts 8 are mounted on but insulated from the base-plate in line with the frame, and the wire 9 to be heated by the current is attached at each end to said posts and at some intermediate point to one of the spindles 6, preferably by having a reverse turn through a transverse hole in said spindle, as shown in Fig. 5. Binding-posts 10 11 are connected with said posts 8. The other wire 12, which is to be heated by the voltage, is attached at one end to the end block 4 and lower guide 3 of the frame and at its other end to a slide or carrier-block 13 of insulating material, such as ivory, agate, or sapphire, which slides in the guides 3 3'. A helical spring 14 is attached at one end to said carrier-block 13 and at the other end to the end block 4'. On the upper spindle 6 is an insulated metal collar 15, to which the spring 14 is electrically connected. Said collar carries a non-resilient spiral conductor 16, whose outer end is secured to an insulating-support 17 and is electrically connected with a binding-post 18. The lower spindle is provided with a similar spiral conductor 19, similarly supported and electrically connected with a binding-post 20. Thus the voltage acts on a circuit from binding-post 20 to lower conducting-spiral 19, thence to the hot wire responsive to volts and the collar 15, conducting spiral 16 back by wire 16ª to binding-post 18.

A light cord 21 is attached at one end to the carrier-block 13 and extends perpendicular to the frame and in the plane of its rotation to a spindle 22, pivotally mounted in bearings 23 on the base-plate. A spiral spring 24 is attached to the spindle and to an arm 25 on the base-plate and not only keeps the cord wound tight, but acts to take up any slack therein and in the wire 9. On the spindle 22 is a pointer 26, which swings over a scale 27, supported on standards 28. The spiral spring 24, one end of which is attached to the fixed abutment or arm 25 and the other end to the shaft 22, to which the cord 21 is connected, always keeps this cord taut and pulls against the slide 13. If, however, this slide is truly central—that is to say, in its normal position—the movable system comprising the pivots 5 6 and the frame 2 is unaffected, and if current exists in the wires 9 these wires are simply eased up by their expansion. When, however, the slide 13 is shifted eccentrically by the biasing-spring 14 when the wire 12 carries current, the spiral spring 24 has a leverage on the movable system referred to and partially rotates it as far as the slackness in the wires 9 will permit.

The metal base-plate is mounted on a slab 29 of insulating material, in which are inserted the binding-posts 10, 11, 18, and 20. The metal base-plate has a coefficient of expansion equal to that of the hot wires, so as to compensate for changes in external temperature.

The operation of our volt-ampere meter is as follows: With no current in the wire 12 the center of the carrier-block coincides with the axis of pivotal movement of the spindles 6 and frame 2. If current is supplied through the wire 9 without the wire 12 being energized, there will be no tendency for the pointer 26 to move, because, although the elongation of the wire 9 may permit the frame 2 to rotate slightly, the point of attachment of the cord to the carrier-block is not moved out of the axis of rotation, and there is consequently no slack in the cord. Again, if the wire 12 alone were energized there would be no movement of the pointer, because the cord is relatively so long with reference to the maximum travel of the carrier-block in the frame that any movement of the block when the frame is in its normal position will not slacken the cord sufficiently to influence the pointer; but when both wires are energized, one by the current and the other by the voltage, and expand from the heat due thereto the helical spring 14 draws the carrier-block to one side and the slack of the wire 9 permits the spiral spring 24 to turn the spindle 22 and wind up the cord 21 until the turning of the spindle 6 has taken up the slack in the wire 9. The resultant movement of the pointer, due to the product of the elongations of the two wires, indicates upon the scale the product of the amperes and volts, which in a direct-current circuit will be the true watts.

What we claim as new, and desire to secure by Letters Patent of the United States, is—

1. A hot-wire volt-ammeter comprising a wire responsive to amperes and one responsive to volts, and means for multiplying together their expansions.

2. A hot-wire volt-ammeter comprising a wire responsive to amperes and one responsive to volts, a shaft governed by one of said wires, and an indicator connected to a device governed by the other, said device being biased for movement away from the center of the shaft.

3. A volt-ampere meter comprising two wires, one arranged to be heated by the current and the other by the voltage in a circuit, and means for indicating the resultant of the expansions of both wires.

4. A volt-ampere meter comprising two wires, arranged to be heated respectively by the current and the voltage in a circuit, a movable element connected with each wire, and movable when said wire expands or contracts, and means for indicating the resultant of the movements of said elements.

5. A volt-ampere meter comprising two wires arranged to be heated respectively by the current and the voltage in a circuit, a pivoted guide connected with one of said wires, a slide connected with the other wire and movable along said guide, and means for indicating the resultant movements of the guide and slide.

6. A volt-ampere meter comprising two wires arranged to be heated respectively by the current and the voltage in a circuit, a pivoted frame movable with the expansion of one of said wires, and carrying the other wire, a slide movable in said frame by the expansion of the wire therein, and means for indicating the resultant movement of the frame and slide.

7. A volt-ampere meter comprising two wires arranged to be heated respectively by the current and the voltage in a circuit, a frame pivoted on a spindle to which one of said wires is attached, a slide movable in said frame and connected by the other wire with one end of said frame, a spring holding said slide normally at the axis of pivotal movement of the frame, and indicating devices attached to said slide.

8. A volt-ampere meter comprising a frame pivoted to swing in a given plane, a slide movable along said frame from a position in the pivotal axis thereof, a cord attached to said slide and extending perpendicular to said frame in the plane of its rotation, a pointer provided with means for moving it when said cord is slacked, a hot wire attached to said frame, and a second hot wire carried by the frame and adapted to move said slide.

9. A volt-ampere meter comprising a frame composed of parallel metal guides, with insulating end blocks, spindles projecting from said guides, a hot wire attached to one of said spindles, an insulating carrier-block adapted to slide in said guides, a hot wire attached to one end block and said carrier-block, a spring attached to said carrier-block and the other end block, flexible conductors conveying current to the frame-supported wire, a cord attached to the carrier-block and wound on a spindle, and a spring and a pointer attached to said spindle.

10. A volt-ampere meter comprising a frame composed of two parallel metal guides, with insulating end blocks, spindles projecting from said guides, an insulating carrier-block sliding in said guides, a wire attached to one of the end blocks and the carrier-block, a helical spring attached to the other end block and the carrier-block and keeping the latter normally in the axial line of the spindles, a bushing on each spindle, one of said bushings being insulated and each connected with one end of the wire, spiral conductors attached to each bushing, insulated posts carrying a second wire attached to one of said spindles, a cord attached to the carrier-block, and devices for taking up slack in said cord and indicating the amount thereof.

In witness whereof we have hereunto set our hands this 28th day of March, 1902.

MAURICE C. RYPINSKI.
JOSEPH LE CONTE DAVIS.

Witnesses:
BENJAMIN B. HULL,
HELEN ORFORD.